United States Patent [19]
Tobita et al.

[11] Patent Number: 5,452,427
[45] Date of Patent: Sep. 19, 1995

[54] DATA PROCESSING DEVICE FOR VARIABLE WORD LENGTH INSTRUCTION SYSTEM HAVING SHORT INSTRUCTION EXECUTION TIME AND SMALL OCCUPANCY AREA

[75] Inventors: Eiji Tobita; Toshiharu Ohshima, both of Kawasaki, Japan

[73] Assignee: Fujitsu Limited, Kawasaki, Japan

[21] Appl. No.: 315,844

[22] Filed: Sep. 30, 1994

Related U.S. Application Data

[63] Continuation of Ser. No. 171,970, Dec. 23, 1993, abandoned, which is a continuation of Ser. No. 551,981, Jul. 12, 1990, abandoned.

[30] Foreign Application Priority Data

Jul. 14, 1989 [JP] Japan .................. 1-180583

[51] Int. Cl.$^6$ .................. G06F 9/30
[52] U.S. Cl. .................. 395/375; 364/DIG. 1; 364/DIG. 2; 364/231.8; 364/259; 364/259.8; 364/259.9; 364/262.81; 364/232.8; 364/927.8; 364/925.6; 364/947; 364/951.5
[58] Field of Search .................. 364/DIG. 1 MS File, 364/ DIG. 2 MS File; 395/375, 400, 425, 500, 325, 800

[56] References Cited

U.S. PATENT DOCUMENTS

| | | | |
|---|---|---|---|
| 3,961,313 | 6/1976 | Bodner et al. | 395/375 |
| 4,236,206 | 11/1980 | Strecker et al. | 395/375 |
| 4,454,578 | 6/1984 | Matsumoto et al. | 395/375 |
| 4,502,111 | 2/1985 | Riffe et al. | 395/775 |
| 4,635,194 | 1/1987 | Burger et al. | 395/375 |
| 4,837,678 | 6/1989 | Culler et al. | 395/375 |
| 4,847,759 | 7/1989 | Oklobdzija | 395/425 |
| 5,109,495 | 4/1992 | Fite et al. | 395/375 |
| 5,113,515 | 5/1992 | Fite et al. | 395/375 |

FOREIGN PATENT DOCUMENTS 0220684  5/1987  European Pat. Off. .

*Primary Examiner*—Robert B. Harrell
*Attorney, Agent, or Firm*—Nikaido, Marmelstein, Murray & Oram

[57] ABSTRACT

A first instruction bit string following a memory position indicated as a start point by a read pointer is previously read out from a plurality of memory cells to a plurality of bit lines, a second instruction bit string already transferred to an instruction decoder is temporarily stored in a latch circuit by an instruction length notification signal output from said instruction decoder, and a select circuit selects a next instruction bit string sequentially continuing from a next instruction, between the first and second instruction bit strings without requiring other bit lines or word lines. Therefore, a high speed instruction processing in the pipeline processing can be obtained with a minimum number of transistors and associated wiring required for memory cells in an instruction buffer memory. Large scale integration, small size, and a low cost can therefore be realized.

13 Claims, 13 Drawing Sheets

Fig.2
PRIOR ART
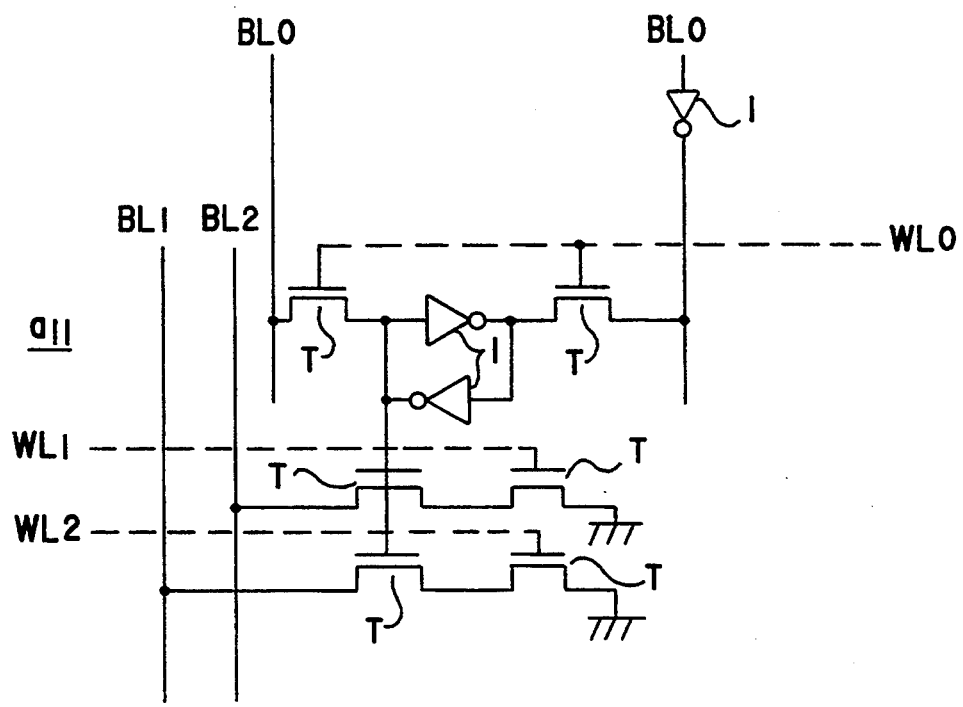
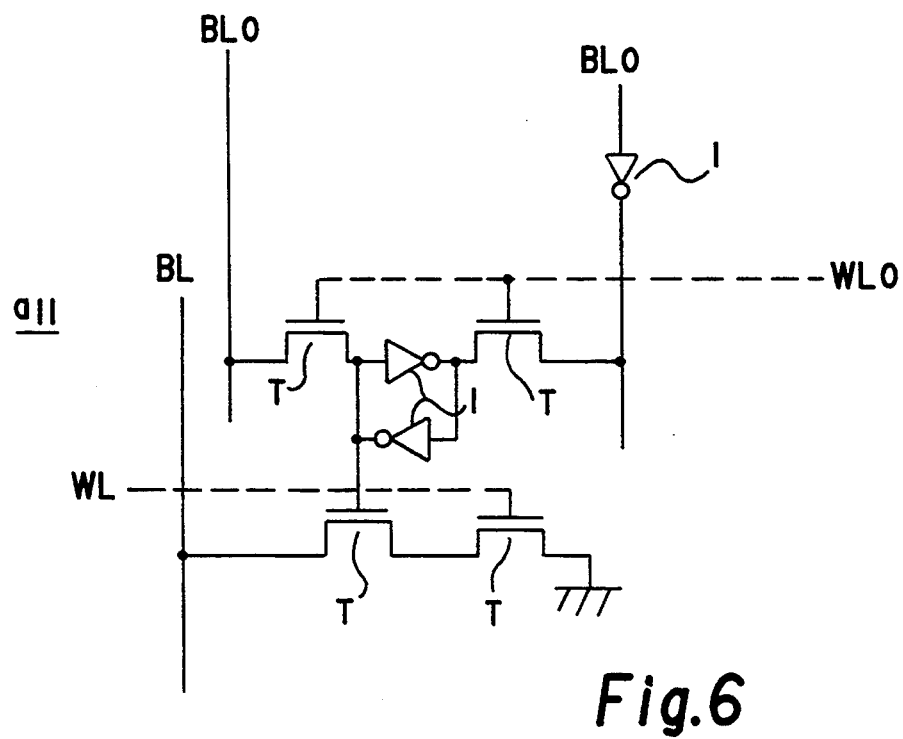
Fig.6

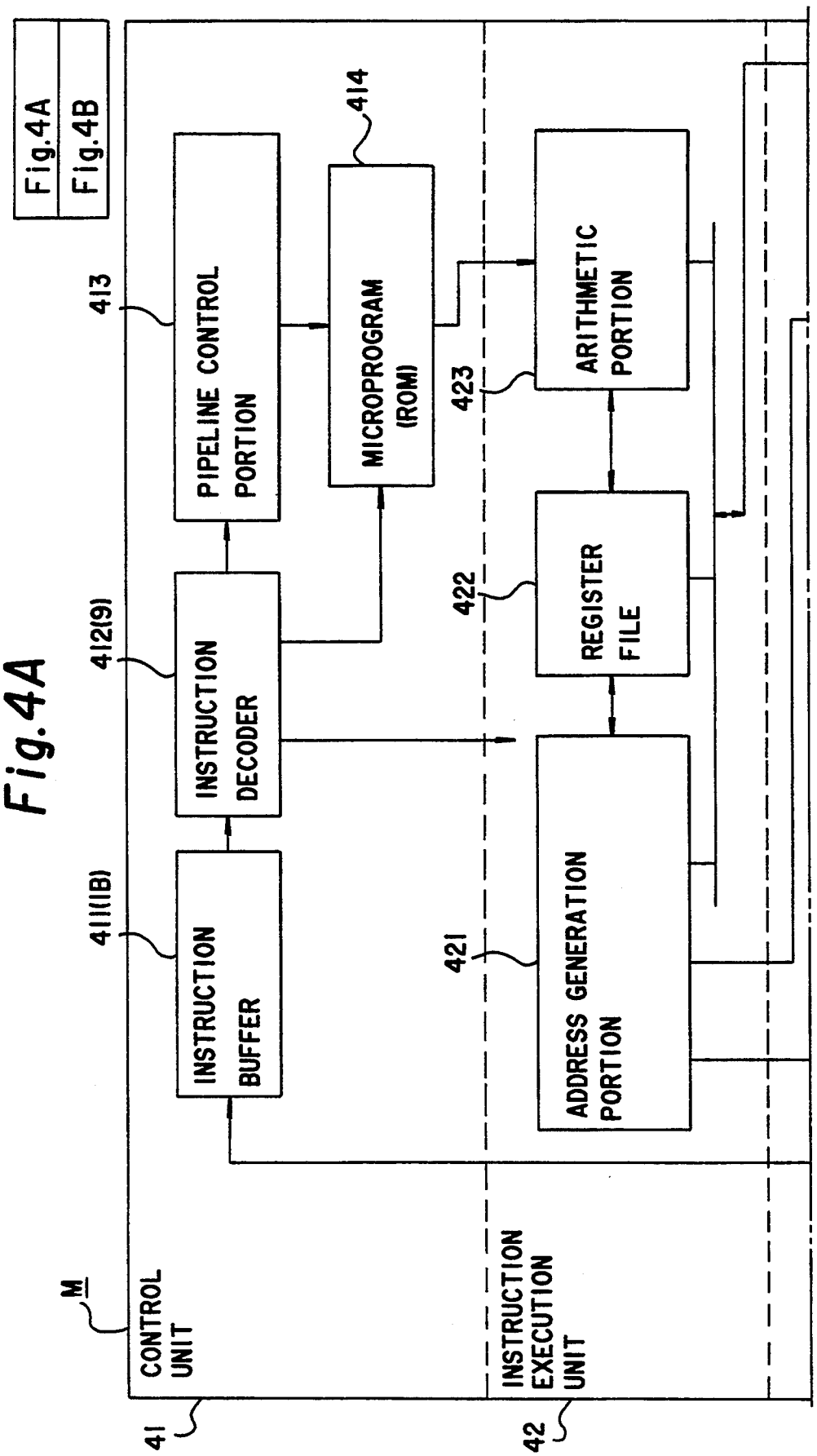

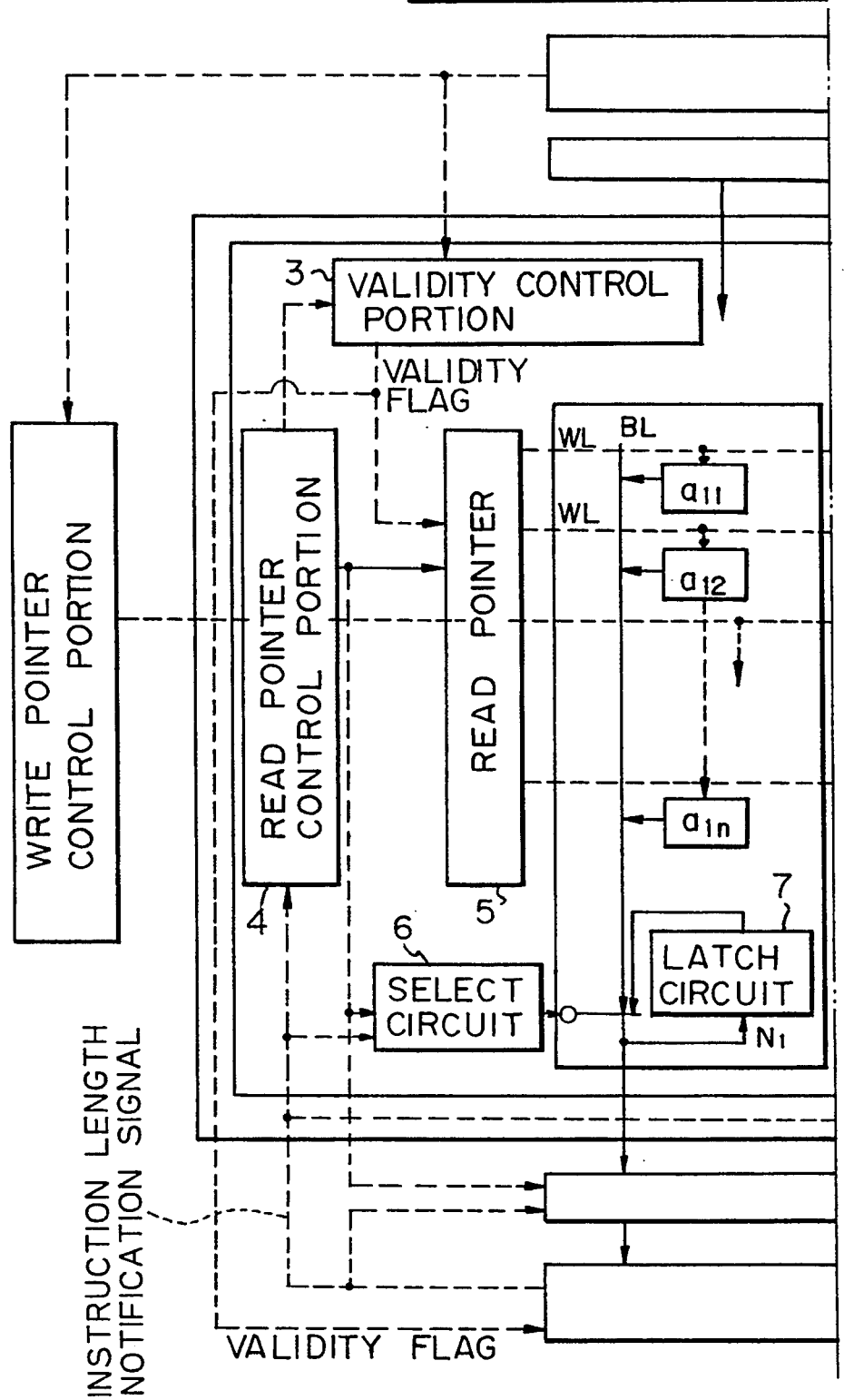

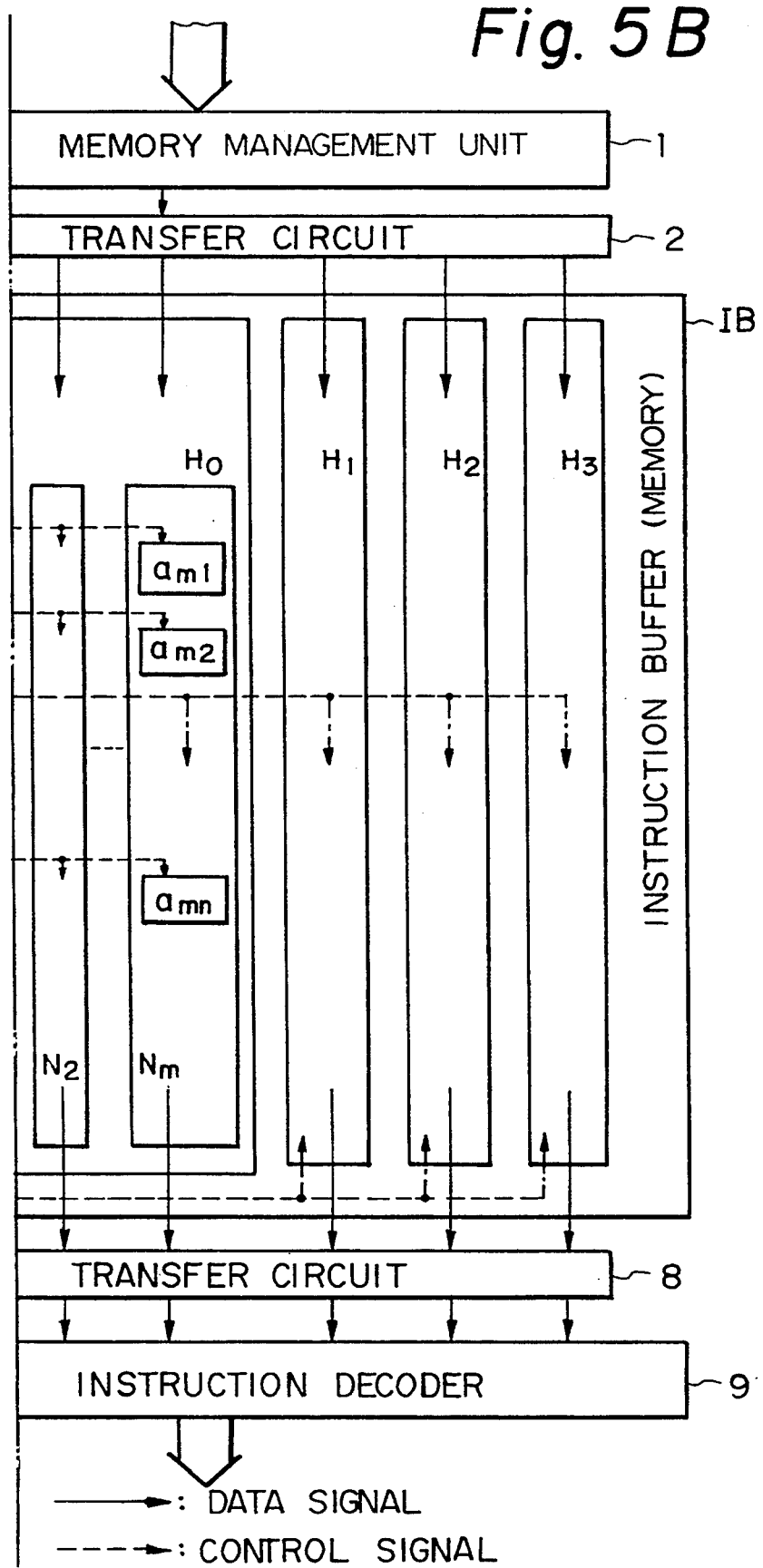

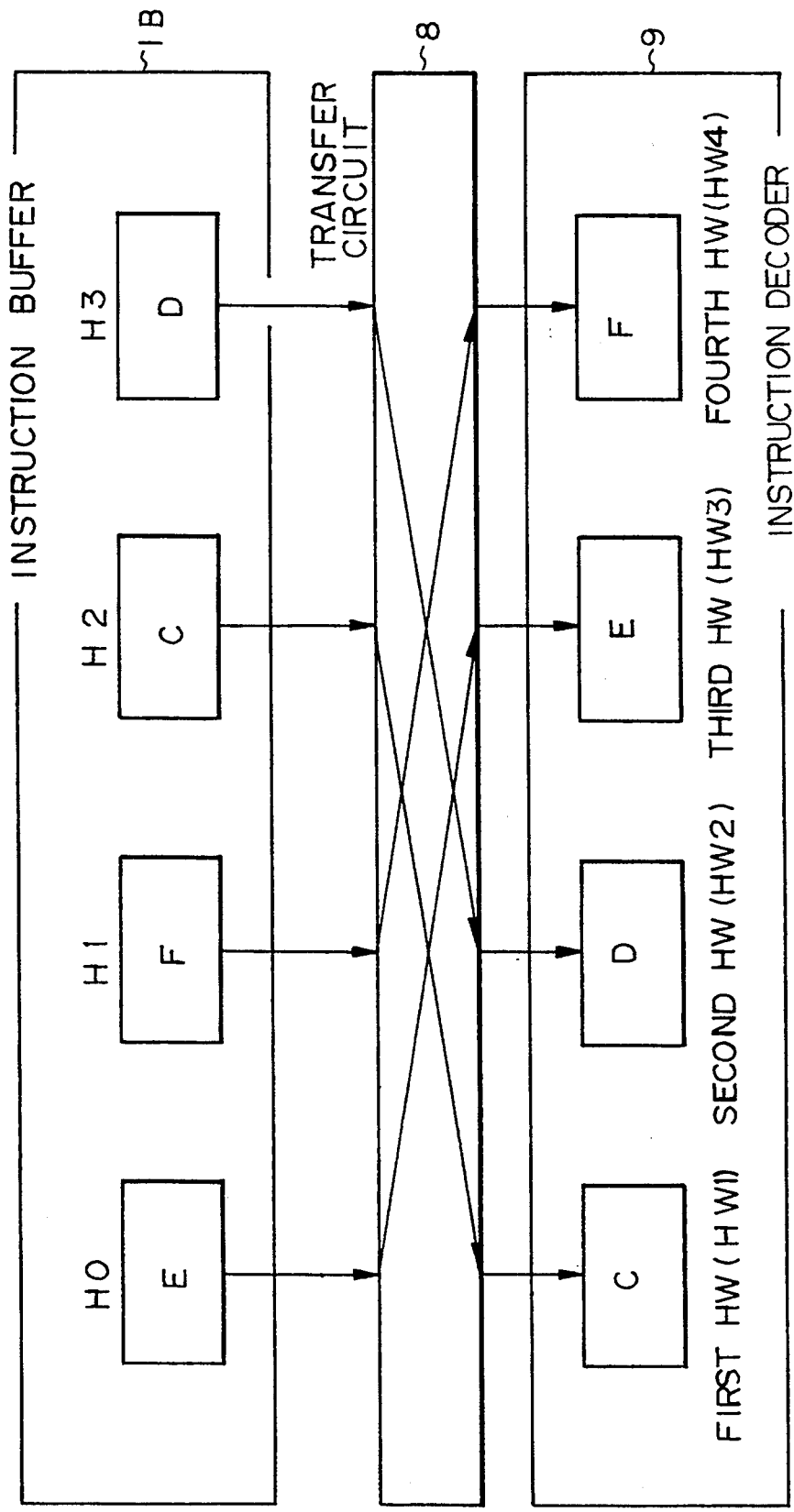

↓ : STARTING POSITION OF INSTRUCTION AFTER SELECTED BY THE SELECT CIRCUIT

DATA PROCESSING DEVICE FOR VARIABLE WORD LENGTH INSTRUCTION SYSTEM HAVING SHORT INSTRUCTION EXECUTION TIME AND SMALL OCCUPANCY AREA

This application is a continuation of application Ser. No. 08/171,970 filed Dec. 23, 1993, which in turn is a continuation of application Ser. No. 07/551,981, filed Jul. 12, 1990, both now abandoned.

BACKGROUND OF THE INVENTION

1. Field of the Invention

The present invention relates to a data processing device (microprocessing unit), more particularly, to a data processing device for a variable length instruction system using pipeline processing.

2. Description of the Related Art

Conventionally, in a general data processing device, considerable time is spent reading our data from memory cells to bit lines, as each of the bit lines has a large load capacity. Therefore, it has been impossible to transfer a next instruction string following an instruction beginning into an instruction decoder in a short time, so that a delay time becomes large and an instruction processing speed cannot be decreased.

In consideration of the above, a data processing device, which can decrease the time required for reading out data from memory cells, has been studied and proposed as related art. A data processing device which can decrease the time for reading out data from memory cells comprises a memory management unit, an instruction buffer (instruction buffer memory), and an instruction decoder. In this data processing device, two word lines (a first word line and a second word line) are provided for each single memory cell in the instruction buffer, and data are read out to corresponding bit lines. The first word line is connected to a first read pointer, the second word line is connected to a second read pointer, and instruction bit strings designated by the first and second read pointers are read out to the bit lines. Note, in the data processing device according to the related art, memory cells which store an instruction bit string following the next instruction beginning are only specified, after receiving an instruction length notification signal output from the instruction decoder.

Further, the data are read out from the specified memory cells to the bit lines, and the data are latched and transferred to the instruction decoder.

As described above, in the general data processing device, an instruction processing speed cannot be decreased, as a load capacity of each bit line is quite large. On the other hand, in the data processing device according to the related art, two bit lines and two word lines are required, furthermore, transistors connected to respective word lines are also required, and thus a large scale integration, a small size, and a low cost cannot be realized.

Incidentally, in a data processing device, pipeline processing has been used in order to realize a high speed operation. In recent years, this pipeline processing is also used in a monolithic microprocessor such as a 32-bit microprocessing unit using a TRON (The Realtime Operating system Nucleus) architecture. In pipeline processing, a single instruction processing has been divided into several processings (several pipeline stages), and a plurality of pipeline stages have been carried out in parallel, so that high speed processing can be realized.

Nevertheless, in a variable length instruction system using pipeline processing, the length of an instruction cannot be known and a starting point of the newt instruction cannot be discriminated before decoding the instruction. Namely, in the variable length instruction system, a starting point of a next instruction can only be discriminated after decoding the instruction, and thus an instruction processing time is determined in accordance with the time taken to decode the instruction, discriminate the instruction length (instruction word length), and read out the next instruction. For example, even if a processing time of a single pipeline stage is shortened, a start of decoding (or processing) the next instruction is still slow, so instruction processing speed cannot be reduced. Therefore, it is pressingly required to greatly increase a transition speed (or shorten a transition time) for discriminating an instruction length and read out a next instruction. Furthermore, in a monolithic microprocessor such a device formed in a single semiconductor body, it is desired to minimize a chip size to reduce production cost, decrease power consumption, and improve production yield thereof.

SUMMARY OF THE INVENTION

It is an object of the present invention to provide a data processing device having a high speed instruction processing in pipeline processing. Furthermore, it is another object of the present invention to decrease the number of transistors and amount of wiring constituting memory cells in an instruction buffer, and to realize a large scale integration, a small size, and a low cost thereof.

According to the present invention, there is provided a data processing device for executing a variable length instruction, wherein the data processing device comprises: an instruction buffer memory having a plurality of rows, each of the rows storing a plurality of bit string units; a read pointer, for indicating one of the rows; an instruction decoder supplied with the bit string units; a latch unit, connected to the instruction buffer memory, for storing bit string units read out in an immediately preceding step from one of the rows; and a select unit, for selecting an output of the instruction buffer memory or an output of the latch unit to supply a beginning bit string unit of the instruction and subsequent bit string unit.

Each of the rows in the instruction buffer memory may be divided into a plurality of blocks. Each of the blocks may include a plurality of memory cells, the latch unit may include a plurality of latch circuits, the select unit may include a plurality of select circuits, and each select circuit group may be controlled to output data selected from a combination data of the output of the instruction buffer memory and the output of the latch unit. Each of the memory cells in one of the rows may be connected to a single word line through a single gate transistor and a single bit line for a reading out operation.

The bit string units selected by the select unit may be transferred through a transfer circuit to the instruction decoder. The transfer circuit may rotate a plurality of bit string units constituting the instruction bit string for changing the order of the bit string units to an original order. The data processing device may be used for a variable length instruction system using pipeline processing.

According to the present invention, there is also provided a data processing device comprising, a memory management unit, an instruction buffer memory connected to the memory management unit, and an instruction decoder, connected to the instruction buffer memory, for decoding an instruction bit string transferred from the instruction buffer memory, for discriminating an instruction length of the instruction contained in the instruction bit string, and for outputting an instruction length notification signal, wherein the instruction buffer memory comprises: a memory portion, for storing instruction bit strings; a latch circuit, for temporarily holding an instruction bit string transferred in an immediately preceding step; a validity control portion, for outputting a unit validity flag indicating whether each bit string units constituting the instruction bit string transferred to the instruction decoder is valid or not as an instruction; a read pointer control portion, for indicating a memory position in the memory portion where the instruction bit strings transferred to the instruction decoder has been stored; a read pointer, for indicating another memory position obtained by shifting by a unit length corresponding to the number of the unit validity flag, from the memory position indicated by the read pointer control portion; and a select circuit, for selecting a next instruction bit string sequentially continuing from a next instruction, between a first instruction bit string and a second instruction bit string, the first instruction bit string being previously read out from a plurality of memory cells in the memory portion to a plurality of bit lines by a memory position indicated by the read pointer being a start point, and the second instruction bit string being temporarily held in the latch circuit by an instruction length notification signal output from the instruction decoder.

The instruction buffer memory may be divided into a plurality of blocks each constituted by a half word. Each of the blocks may include a plurality of memory cells, a latch circuit, and a select circuit, respectively. Each of the memory cells in a row may be connected to a single word line through a single gate transistor and a single bit line for a reading out operation. An instruction bit string output from the instruction buffer memory may be transferred through a transfer circuit to the instruction decoder. The transfer circuit may rotate a plurality of bit string units constituting the instruction bit string for changing the order of the bit string units to an original order. The data processing device may be used for a variable length instruction system using pipeline processing.

Further, according to the present invention, there is provided a data processing device comprising: an instruction decoder decoding an instruction bit string and discriminating an instruction length of the instruction contained in the instruction bit string, and for outputting an instruction length notification signal; and an instruction buffer memory, connected to the instruction decoder, for transferring an instruction bit string to the instruction decoder, including: a memory unit, for storing instruction bit strings; a latch unit, for temporarily holding an instruction bit string transferred in an immediately preceding step; a validity control unit, for outputting a unit validity flag indicating whether each bit string units constituting the instruction bit string transferred to the instruction decoder is valid or not as an instruction; a read pointer control unit, for indicating a memory position in the memory unit where the instruction bit strings transferred to the instruction decoder has been stored; a read pointer indicating another memory position obtained by shifting by a unit length corresponding to the number of the unit validity flag, from the memory position indicated by the read pointer control unit; and a select unit for selecting a next instruction bit string sequentially continuing from a next instruction, between a first instruction bit string and a second instruction bit string, the first instruction bit string being previously read out from a plurality of memory cells in the memory unit to a plurality of bit lines by a memory position indicated by the read pointer being a start point, and the second instruction bit string being temporarily held in the latch unit by an instruction length notification signal output from the instruction decoder.

Furthermore, according to the present invention, there is provided a monolithic microprocessor formed in a single semiconductor body, comprising an instruction control unit for controlling fetching, decoding, and executing of instructions, an instruction execution unit for calculating an operand address and executing an operand operation, a memory management unit, and a bus control unit for transferring data among an external I/O, an external memory, and the data processing device through the chip bus, wherein the instruction control unit comprises: an instruction decoder, for decoding an instruction bit string, for discriminating an instruction length of the instruction contained in the instruction bit string, and for outputting an instruction length notification signal; and an instruction buffer memory having a plurality of rows, each of the rows storing a plurality of bit string units; a read pointer, for indicating one of the rows; an instruction decoder supplied with the bit string units; a latch unit, connected to the instruction buffer memory, for storing bit string units read out in an immediately preceding step from one of the rows; and a select unit, for selecting an output of the instruction buffer memory or an output of the latch unit to supply a beginning bit string unit of the instruction and subsequent bit string unit.

Additionally, according to the present invention, there is also provided a data processing method for supplying a variable length instruction from an instruction buffer memory to an instruction decoder, wherein the data processing method comprises: a step of temporarily holding a first instruction bit string read out in an immediately preceding step from the instruction buffer memory; a step of reading out a second instruction bit string from the instruction buffer memory at a memory position indicated by a read pointer; and a step of selecting instruction bit strings from among the first and second instruction bit strings.

BRIEF DESCRIPTION OF THE DRAWINGS

The present invention will be more clearly understood from the description of the preferred embodiments as set forth below with reference to the accompanying drawings, wherein:

FIG. 2 is a circuit diagram showing a memory cell in the data processing device shown in FIG. 1;

FIG. 4A and 4B from a block diagram illustrating an example of the whole data processing device according to the present invention;

FIG. 5A and 5B from a block diagram illustrating a part of one embodiment of the data processing device according to the present invention;

FIG. 6 is a circuit diagram illustrating a memory cell in the data processing device shown in FIG. 5;

FIG. 8 is a block diagram illustrating an instruction buffer, a transfer circuit, and an instruction decoder in the data processing device according to the present invention;

DESCRIPTION OF THE PREFERRED EMBODIMENTS

First, a data processing device according to the related art will be explained, with reference to FIGS. 1 and 2.

In a general data processing device for a variable length instruction system using pipeline processing, a considerable time is spent reading out data from memory cells to bit lines, as each of the bit lines has a large load capacity, and a signal level at the bit line cannot be changed immediately. Therefore, a next instruction string cannot be transferred to the instruction decoder in a short time, and an instruction processing speed cannot be decreased.

In consideration of the above, a data processing device, which can decrease a time for reading out data from the memory cells, has been studied and proposed as the related art.

Figure 1:
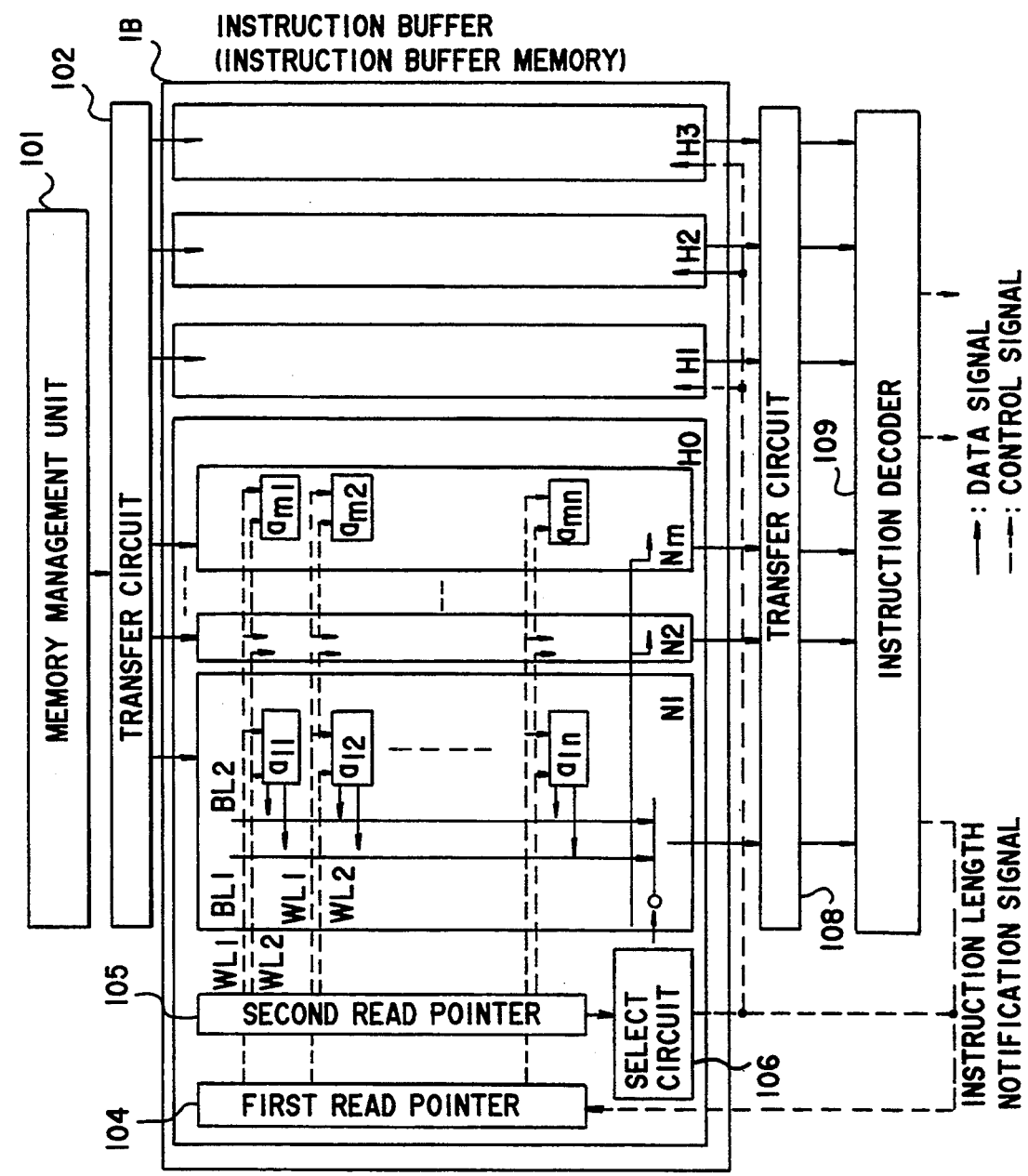
FIG. 1 is a block diagram illustrating a part of an example of a data processing device according to the related art.

FIG. 1 is a block diagram illustrating a part of an example of a data processing device according to the related art. As shown in FIG. 1, the data processing device (microprocessing unit) comprises a memory management unit 101, an instruction buffer IB, and an instruction decoder 109. In the data processing device, instruction data are supplied from the memory management unit 101 through a transfer circuit 102 to the instruction buffer IB, and further an instruction bit string is transferred from the instruction buffer IB through a transfer circuit 108 to the instruction decoder 109.

FIG. 2 is a circuit diagram showing a memory cell in the data processing device shown in FIG. 1. As shown in FIGS. 1 and 2, two word lines of a first word line $WL_1$ and a second word line $WL_2$ for a read out process are connected to each of the memory cells $a_{11}$ to $a_{mn}$ (in FIG. 2, only one memory cell $a_{11}$ is illustrated) in the instruction buffer IB, and the data read out from the memory cell $a_{11}$ is transferred through two bit lines $BL_1$, $BL_2$ for the read out process. The circuit of FIG. 2 includes six transistors T and three inverters I. Note, in FIG. 2, a word line $WL_0$ is only used for a write process, and two bit lines $BL_0$ are only used for the write process.

As shown in FIG. 1, the first word line $WL_1$ is connected to a first read pointer 104, and the second word line $WL_2$ is connected to a second read pointer 105. An instruction bit string indicated by the first and second read pointers 104, 105 is read out to the bit lines $BL_1$, $BL_2$, and instruction data read out to the bit lines $BL_1$, $BL_2$ are selected by a select circuit 106 and transferred to the transfer circuit 108.

Namely, in the instruction buffer IB of the data processing device shown in FIG. 1, the memory cells $a_{11}$ to $a_{mn}$ which store an instruction bit string following the beginning of the next instruction (next instruction head) are only specified after receiving an instruction length notification signal which is output from the instruction decoder 109, the data are read out from the specified memory cells $a_{11}$ to $a_{mn}$ to the bit lines $BL_1$, $BL_2$, and then the data are latched and transferred to the instruction decoder 109.

As described above, in the data processing device shown in FIGS. 1 and 2, two bit lines $BL_1$, $BL_2$ and two word lines $WL_1$, $WL_2$ are required for a read out process, furthermore, transistors connected to respective word lines $WL_1$, $WL_2$ are also required for the read out process, and thus a large scale integration, a small size, and a low cost cannot be realized.

Below, the preferred embodiments of a data processing device according to the present invention will be explained, with reference to the accompanying drawings.

Figure 3:
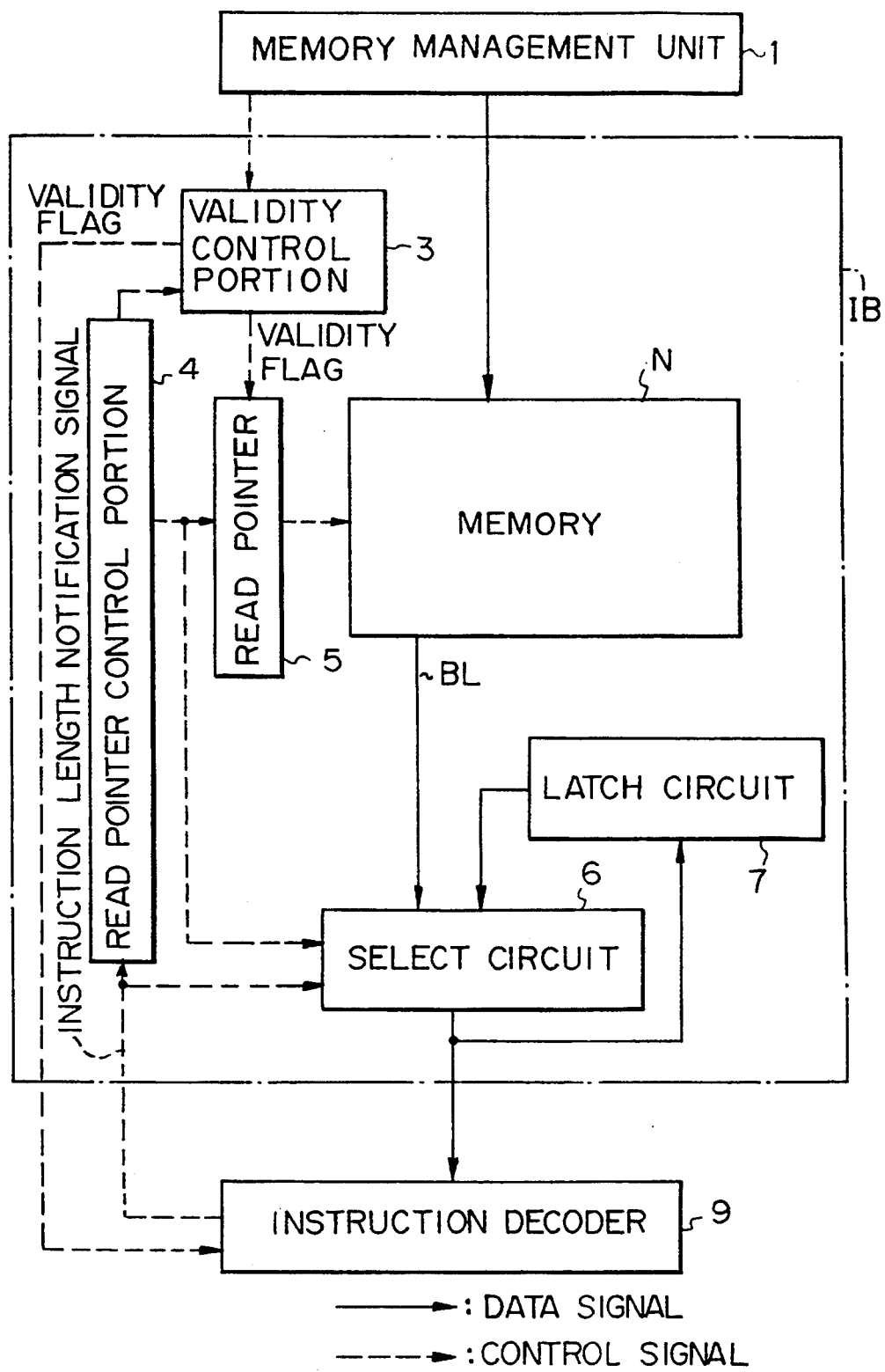
FIG. 3 is a block diagram illustrating a principle of a data processing device according to the present invention.

FIG. 3 is a block diagram illustrating a principle of a data processing device according to the present invention.

As shown in FIG. 3, the data processing device comprises a memory management unit 1, an instruction buffer (instruction buffer memory) IB including a memory N for storing an instruction bit string output from the memory management unit 1, and an instruction decoder 9 for decoding the instruction bit string containing a single instruction or a plurality of instructions.

The instruction buffer IB also includes a latch circuit 7, a validity control portion 3, a read pointer control portion 4, a read pointer 5, and a select circuit 6. The latch circuit 7 temporarily holds an instruction bit string transferred at an immediately preceding step in pipeline processing. The validity control portion 3 outputs a validity flag which indicates whether or not each bit string unit is a valid bit string as a instruction. Note, the instruction bit string transferred to the instruction decoder 9 is constituted by a plurality of the bit string units. The read pointer control portion 4 indicates a memory position where the instruction bit string transferred to the instruction decoder 9 is stored. The read pointer 5 indicates a memory position obtained by shifting by unit lengths corresponding to the number of the bit string units of the validity flag from the memory position indicated by the read pointer control portion 4.

The select circuit 6 selects between an instruction bit string read out to a plurality of bit lines BL and an instruction bit string temporarily stored in the latch circuit 7, and outputs the beginning of the next instruction bit string which sequentially continues from the next instruction to the instruction decoder. Note, the beginning of an instruction bit string read out to a plurality of bit lines BL is indicated by the read pointer 5, and the instruction bit string temporarily stored in the latch circuit 7 is read out in accordance with an instruction length notification signal output from the instruction decoder 9.

As described above, the data processing device according to the present invention, using a variable length instruction system, realizes a high speed transition from an instruction decode stage to the next decode stage of pipeline processing, and realizes an improvement in processing speed for the data processing device as a whole. Additionally, in the data processing device according to the present invention, the number of transistors and wirings can be reduced, and thus a larger scale integration, a smaller size, and a lower cost can be obtained.

Figure 4B:
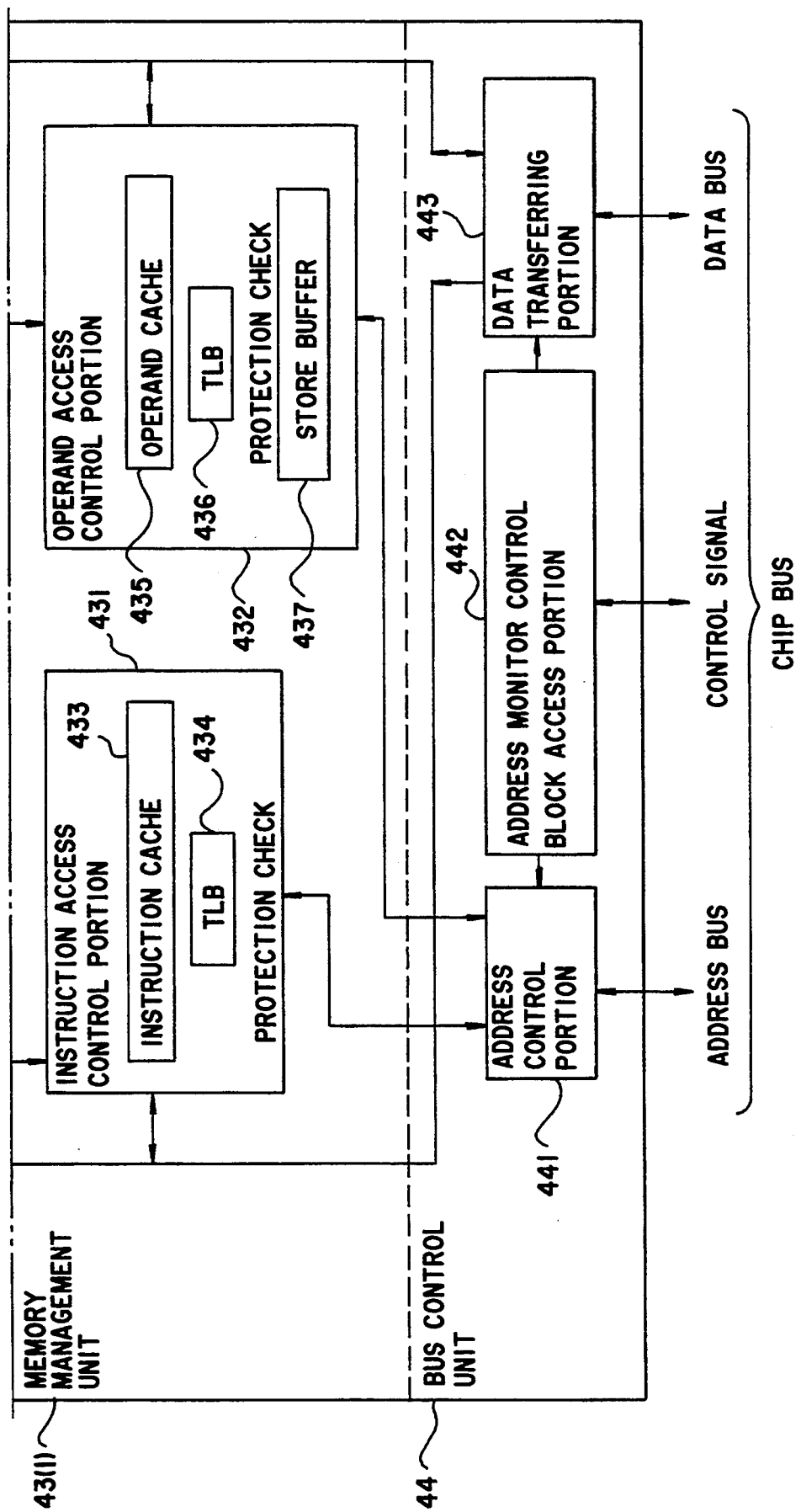

FIGS. 4A and 4B from a block diagram illustrating an example of the whole data processing device according to the present invention. As shown in FIGS. 4A and 4B the data processing device M, which is a monolithic microprocessor formed in a single semiconductor body, comprises an instruction control unit 41, an instruction execution unit 42, a memory management unit 43 (1), and a bus control unit 44.

The instruction control unit 41, which is used to control fetching, decoding, and executing instructions, comprises an instruction buffer 411 (IB), an instruction decoder 412 (9), a pipeline control portion 413, and a microprogram 414. The instruction buffer 411, which is an instruction queue, is used to efficiently process a variable length instruction. A prefetching operation for instructions is continuously carried out until the instruction queue (instruction buffer) 411 has no vacant buffer area. Note, this instruction prefetching operation is independently carried out without executing the instructions. Further, when a required instruction is stored in the instruction buffer IB (instruction queue 411), an access of an external memory (main memory) is not carried out. In the instruction decoder 9 (412), an instruction format, an instruction type, and an addressing mode are analyzed, and information for controlling pipeline processing, calculating an operand address, and starting a microprogram is output therefrom. In the pipeline control portion 413, an instruction is divided into independent five stage (five-stage pipeline processing) in one machine cycle, and is continuously executed. The microprogram 414, which is constituted by a read only memory, outputs detailed control information to an arithmetic portion 423 which described below.

The instruction execution unit 42, which is used to calculate an operand address and carry out an operand operation, comprises an address generation portion 421, a register file 422, and the arithmetic portion 423. In the address generation portion 421, an address calculation is carried out in accordance with the addressing mode, and the generated address is transferred to the memory management unit 1 (43). The arithemetic portion 423, where a basic operation is carried out, has exclusive circuits for bit field manipulation instructions, multiply-divide calculation instructions, and decimal operation advancing instructions, and operand processings for these instructions are efficiently carried out. The register file 422 includes general purpose registers, work registers, and stack pointers.

The memory management unit 43 (1) comprises an instruction access control portion 431 and an operand access control portion 432. The instruction access control portion 431 includes an instruction cache memory, 433 a TLB (translation look-aside buffer), 434 and a memory protection function. Similarly, the operand access control portion 432 includes an operation cache memory 435, a TLB 436, and a memory protection function. The instruction access control portion 431 and the operand access control portion 432 can operate independently in accordance with control signals output from the instruction execution unit 42. Note, the process of writing instruction execution data is carried out by using a store-through method. When a chip bus is being used, the address and the data are stored in a storage buffer 437 until the data can be output. In the case that an area indicated by a write address is stated in the instruction cache 453, an entry corresponding to the area in the instruction cache 433 is invalidated at the timing of writing to the external memory.

The bus control unit 44, which transfer data among an external I/O, the external memory, and the data processing device through the chip bus, comprises an address control portion 441, an address monitor control, block access portion 442, and a data transferring portion 443. The bus control unit 44 has a block access function for transferring one block (for example, 16 bytes of data) to the cache memory at high speed, and an address monitoring function for making the contents of the cache memory and the external memory coincide by monitoring a write address on the chip bus.

The present invention is mainly concerned with the instruction buffer IB (411) of the instruction control unit 41 in the monolithic microprocessor (data processing device) M.

FIGS. 5A and 5B from a block diagram illustrating a part of one embodiment of the data processing data according to the present invention, and particularly illustrating the data processing device of a monolithic microprocessor for performing pipeline processing using a variable length instruction system. FIGS. 5A and 5B the data processing device (monolithic microprocessor) comprises a memory management unit 1, an instruction buffer IB, an instruction decoder 9, and transfer circuits 2 and 8. Furthermore, the instruction buffer IB comprises a latch circuit 7, a validity control portion 3, a read pointer control portion 4, a read pointer 5, and a select circuit 6.

In the data processing device, an instruction bit string (instruction data) is supplied from the memory management unit 1 to the instruction buffer IB through a transfer circuit 2, and a validity of the instruction bit string transferred to the instruction buffer IB is notified to the validity control portion 3. The validity control portion 3 holds validity information of data stored in the instruction buffers IB (memories $N_1$ to $N_m$), and receives information from the read pointer control portion 4. Furthermore, the validity control portion 3 notifies how many validity flags follow the instruction bit string transferred to the instruction decoder IB, to the read pointer 5 and the instruction decoder 9. The read pointer control portion 4 controls the read pointer 5 indicating a memory position where a transfer instruction bit string is stored, and receives an instruction length notification signal from the instruction decoder 9 to resultantly be renewed.

The read pointer 5 designates memory cells for reading out data to bit lines BL, and is renewed by the number of the designated memory cells and the validity flags. The select circuit 6 is used to select data on the bit lines BL and another data temporarily held in the latch circuit 7 according to a state of the read pointer 4 and the instruction length notification signal, and transfers one block of data through a transfer circuit 8 to the instruction decoder 9.

The latch circuit 7 temporarily holds the data transferred in an immediately preceding step to the instruction decoder 9 until the select circuit 6 starts a select operation. Note, data held in the latch circuit 7 is renewed at each step (pipeline step).

The transfer circuit 8 transfers an output instruction bit string in the instruction buffer IB to the instruction decoder 9. The instruction decoder 9 decodes a given instruction bit string, discriminates an instruction length, and then outputs an instruction length notification signal corresponding to the discriminated instruction length. Note, this instruction length notification signal is supplied to the read pointer control portion 4, the select circuit 6, and the transfer circuit 8.

As described above, in the data processing device shown in FIGS. 5A and 5B, starting from the beginning of the instruction bit string (the prior instruction bit string) just before transferring to the instruction decoder 9, the scope of the instruction bit string required for an instruction-decoding of the instruction decoder in the next step is limited. By utilizing the above, the just before (immediately preceding) instruction bit string is temporarily held in the latch circuit 7. Then, a fresh instruction bit string is read out to the bit line BL from a position indicated by the read pointer 5, and thus a delay time can be decreased. Namely, in the data processing device shown in FIG. 5, a delay, between the time when the instruction length notification signal is received and the time when the next instruction bit string is selected and supplied to the instruction decoder 9, can be reduced.

FIG. 6 is a circuit diagram illustrating a memory cell in the data processing device shown in FIGS. 5A and 5B. As shown in FIG. 6, each single word line WL is connected to each of memory cells $a_{11}$ to $a_{mn}$ (for example, $a_{11}$) in the instruction buffer IB, and data is read out to single bit line BL corresponding to the word line WL.

Comparing FIG. 6 with FIG. 2, the memory cell $a_{11}$ shown in FIG. 2 of the related art requires two bit lines $BL_1$, $BL_2$ and two lines $WL_1$, $WL_2$ for a reading out operation, and furthermore, each of the word lines $WL_1$, $WL_2$ respectively requires exclusive gate transistors. To the contrary, the memory cell $a_{11}$ shown in FIG. 6 of the present invention requires only a single bit line BL, a single word line WL for a reading out operation, and only one transistor is required for the single word line WL. FIG. 6 illustrates four transistors T and three inverters I. Note, both memory cells $a_{11}$ shown in FIGS. 2 and 6 equally require two bit lines $BL_0$ and one word line $WL_0$ for a writing operation. As described above, in the memory cell $a_{11}$ according to the present invention, the number of transistors and wirings in the memory cells can be reduced without decreasing the speed of instruction processing in the pipeline processing. Consequently, in the data processing device according to the present invention, a high speed instruction processing in the pipeline processing can be realized, and the number of transistors and wirings constituting memory cells in the instruction buffer can be decreased, so that a large scale integration, a small size, and a low cost thereof can be realized.

Concretely, for example, in the case that an instruction bit string transferred to the instruction decoder 9 (109) is comprised of 64 bits, and the memory capacity of the instruction buffer IB is 64 bits×8 words, with regard to the number of the transistors and wirings in the memory cells, the data processing device shown in FIG. 6 has 64 fewer bit lines, 8 fewer word lines, and 1024 (2 transistors×64 bits×8 words=1024) fewer transistors than the data processing device shown in FIG. 1. Namely, in the above case, the data processing device according to the present invention can be reduced by 64 bit lines, 8 word lines, and 1024 transistors from the data processing device according to the related art.

Note, the data processing device of the present embodiment requires the latch circuit 7 (which is, for example, constituted by 6 transistors), the validity control portion 3, and several connecting wirings. However, the increased number of transistors and wirings due to the above required circuits for the present embodiment is far fewer than that of transistors (for example, 1024 transistors) and wirings (for example, 64 bit lines and 8 word lines) decreased by the present embodiment from the data processing device of the related art. Namely, the data processing device of the present embodiment can much more reduce the number of transistors and wirings, and thus a large scale integration, a small size, and a low cost thereof can be realized. These merits in the present embodiment can be more notable in a larger scale data processing device.

Figure 7A:
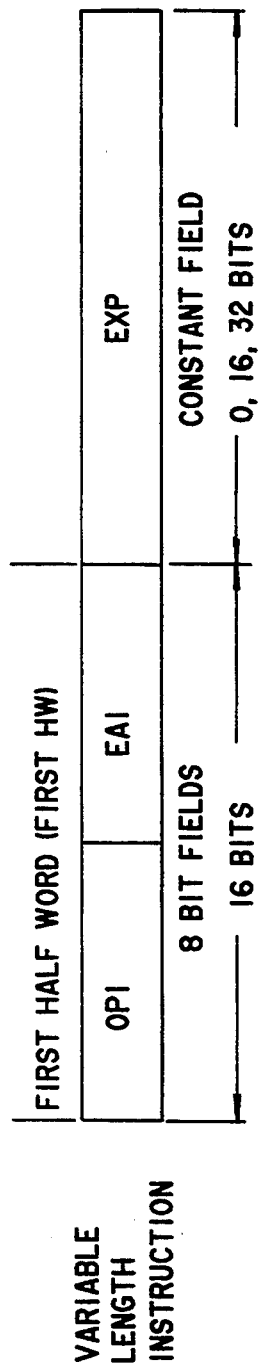
FIGS. 7A and 7B are diagrams for explaining examples of a variable length instruction used in the present invention.
Figure 7B:
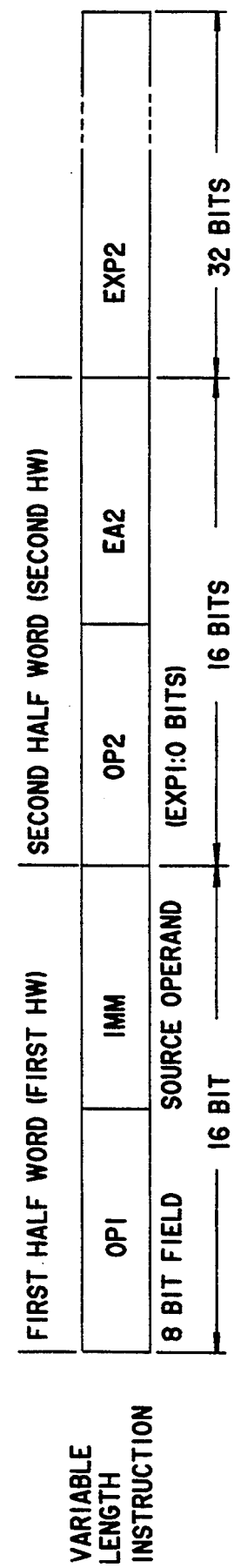

FIGS. 7A and 7B are diagrams for explaining examples of a variable length instruction used in the present invention, more particularly, for explaining examples of an instruction format based on the TRON architecture.

In FIG. 7A, a basic type of the instruction format processed by one instruction decoding process is illustrated, and reference OP1 denotes a field (8 bits) for defining an instruction type and operation, EA1 denotes a field (8 bits) for defining an addressing mode of a source operand, and EXP denotes a constant field (0~32 bits) which accompanies the addressing mode defined by the EA1 field. Note, the EXP field is determined by 0 bits, 16 bits, and 32 bits in accordance with the contents in the EA1 field. A length (number of bits) of the EXP field is confirmed by decoding a first half word (first HW) including the OP1 field and the EA1 field of the instruction. When the length of the EXP field is determined as 16 bits, two half words consisting of the first HW and the EXP field are decoded in the instruction decoder 9 in one decoding operation, and thus the instruction decoder 9 sends an instruction length notification signal indicating two half words to the instruction buffer IB.

Similarly, when the length of the EXP field is determined as 0 bits, the instruction decoder 9 sends an instruction length notification signal indicating one half word to the instruction buffer IB, and when the length of the EXP field is determined as 32 bits, the instruction decoder 9 sends an instruction length notification signal indicating three half words to the instruction buffer IB.

In FIG. 7B, the case when the instruction length notification signal is determined as four half words is illustrated, and reference IMM denotes an immediate field (8 bits) for use as a source operand. Namely, when the source operand is determined as an immediate, or an instruction is an immediate instruction, and the EXP field following the second half word is determined as 32 bits, the instruction length notification signal is determined as four half words. Namely, the above case indicates when the EXP (EXP1) field following the first half word is determined as 0 bits. Note, in the above case, the first half word is not decoded in the instruction decoder 9 and an instruction length notification signal indicating one half word is not output therefrom, but four half words from the first half word to the EXP2 field are simultaneously decoded in the instruction decoder 9 for a high speed operation and an instruction length notification signal indicating four half words is not output therefrom.

FIG. 8 is a block diagram illustrating an instruction buffer IB, a transfer circuit 8, and an instruction decoder 9 in the data processing device according to the present invention. As shown in FIG. 8, an order of instruction codes E, F, C, D output from the instruction buffer IB to the transfer circuit 8 is different from an original order of instruction codes C, D, E, F, and the transfer circuit 8 carries out a rotation operation to change the order of the instruction codes to position the top of the instruction at the first half word (HW1). Namely, in FIG. 8, the instruction code E is transferred from the half word block H0 to the transfer circuit 8, the instruction code F is transferred from the half word block H1 to the transfer circuit 8, the instruction code C is transferred from the half word block H2 to the transfer circuit 8, and the instruction code D is transferred from the half word block H3 to the transfer circuit 8. The transfer circuit 8 rotates and transfers the instruction code C output from the half word block H2 to the first half word (HW1) in the instruction decoder 9, the instruction code D output from the half word block H3 to the second half word (HW2), the instruction code E output from the half word block H0 to the third half word (HW3), and the instruction code F output from the half word block H1 to the fourth half word (HW4), respectively.

FIGS. 9A to 9D are diagrams for explaining various rotation processes in the transfer circuit 8 shown in FIG. 8. As shown in FIGS. 9A to 9D, four rotation operation patterns are carried out in the transfer circuit 8, and the transfer circuit 8 should carry out these four patterns. In FIGS. 9A to 9D, reference " ↓ " denotes a starting position of the instruction after being selected by the select circuit 6. Note, a required rotation pattern in the above four patterns is determined by a position of the instruction starting point indicated by the read pointer 5 and an instruction length notification signal. Furthermore, the select operation and rotation operation are simultaneously carried out at the same timing for a high speed operation. Namely, before completing the select operation in the select circuit 6, the required rotation pattern should be already determined by receiving the instruction length notification signal. Consequently, the starting position indicated by the read pointer 5 and the instruction length notification signal are used for determining where a starting half word is positioned at one of four half words H0 to H3. Note, in the above descriptions, the validity of the instruction codes in the four half words H0 to H3 need not be considered.

Figure 9A:
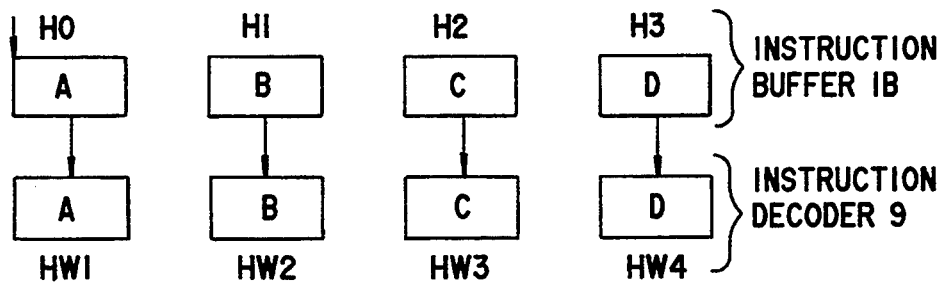
FIGS. 9A, 9B, 9C and 9D are diagrams for explaining various rotation processes in the transfer circuit shown in FIG. 8.
Figure 9B:
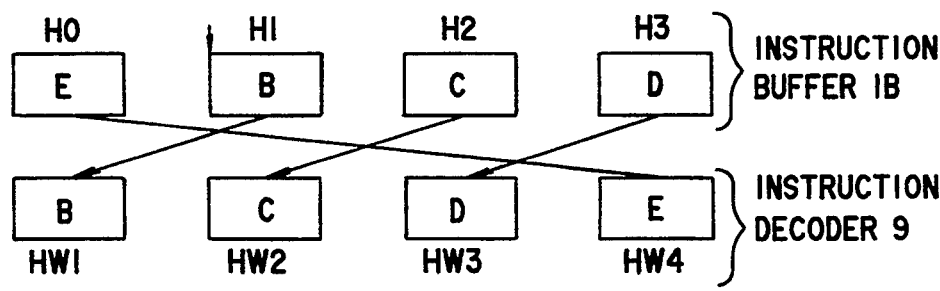
Figure 9C:
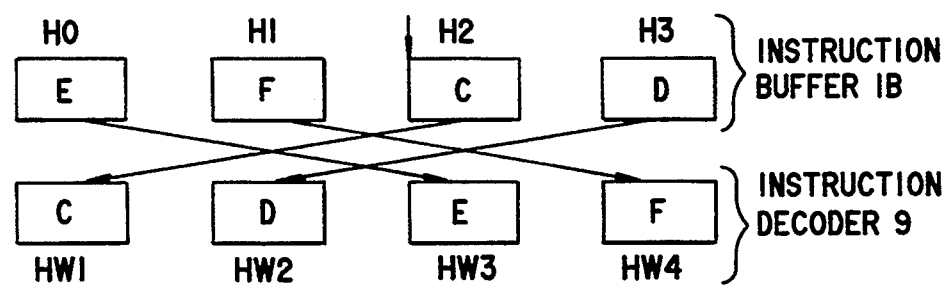
Figure 9D:
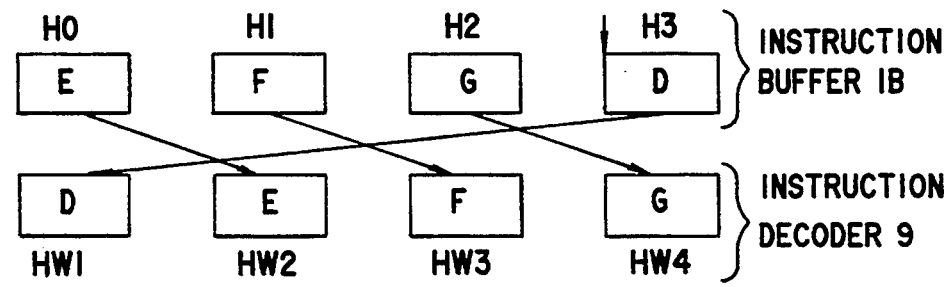
Figure 10:
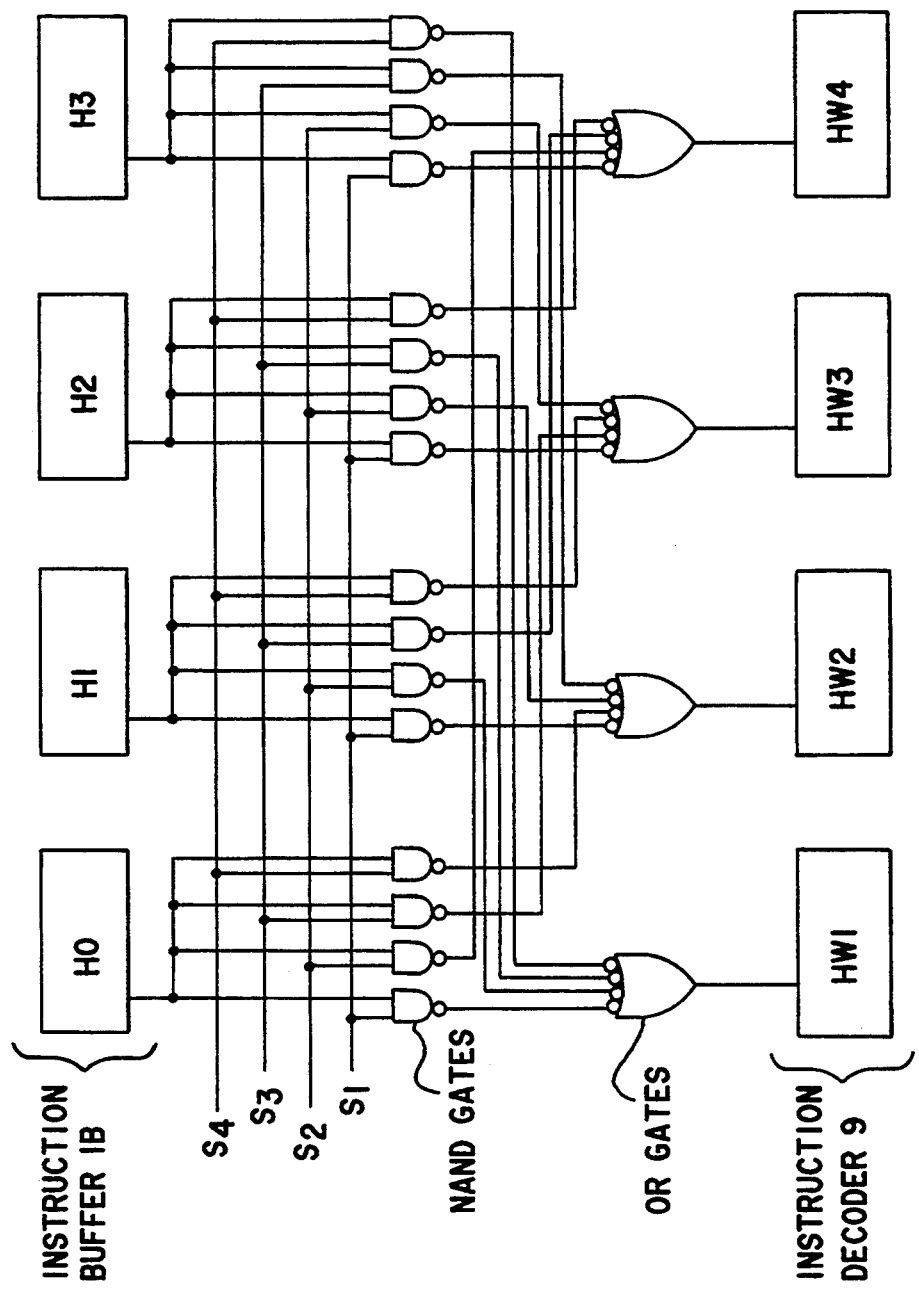
FIG. 10 is a circuit diagram illustrating an example of the transfer circuit shown in FIG. 8.

FIG. 10 is a circuit diagram illustrating an example of the transfer circuit 8 shown in FIG. 8. In FIG. 10, when a signal $S_1$ is at a high level and the other signals $S_2$, $S_3$, $S_4$ are at low levels, a rotation pattern shown in FIG. 9A is selected, and when the signal $S_2$ is at a high level and the other signals $S_3$, $S_4$, $S_1$ are at low levels, a rotation pattern shown in FIG. 9B is selected. Similarly, when the signal $S_3$ is at a high level and the other signals $S_4$, $S_1$, $S_2$ are at low levels, a rotation pattern shown in FIG. 9C is selected, and when the signal $S_4$ is at a high level and the other signals, $S_1$, $S_2$, $S_3$ are at low levels, a rotation pattern shown in FIG. 9D is selected.

Figure 11:
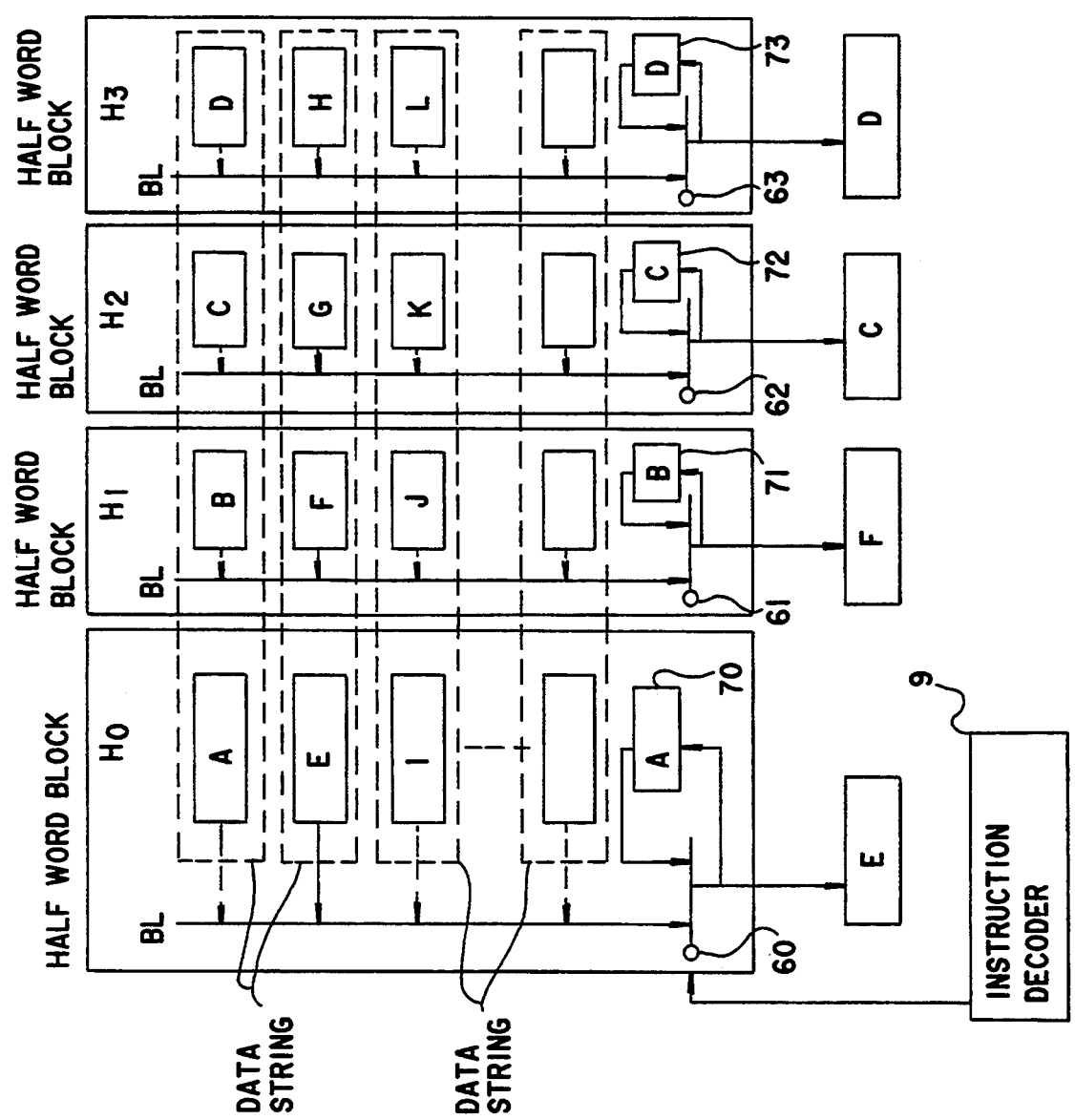
FIG. 11 is a diagram for explaining an example of a select operation in the data processing device according to the present invention.

FIG. 11 is a diagram for explaining an example of a select operation in the data processing device according to the present invention, and particularly is a diagram for illustrating a plurality of instruction codes (instruction units) corresponding to a plurality of bit string units each constituted by a half word (16 bits), in the data processing device shown in FIG. 5. In FIG. 11, four half word blocks $H_0$, $H_1$, $H_2$, $H_3$ are illustrated, and each latch circuit 70, 71, 72, 73 and select circuit 60, 61, 62, 63 are provided in the respective half word blocks $H_0$, $H_1$, $H_2$, $H_3$. In the case that a data string (instruction string) of {A, B, C, D} is transferred to the instruction decoder 9 in the read out processing (transfer processing) of the instruction data in the immediately preceding step, and a data string of {E, F, G, H} is read out in the next step, then the data string of {A, B, C, D} transferred to the instruction decoder 9 in the immediately preceding step is latched in the respective latch circuits 70, 71, 72, 73. Next, the data string of {A, B, C, D} latched in the latch in the latch circuits 70, 71, 72, 73 and the data string of {E, F, G, H} which has been read out to the respective bit lines BL are selected by the corresponding select circuits 60, 61, 62, 63. Concretely, in FIG. 11, there the state is shown in which, according to the instruction length notification signal {2}, an instruction string of {C, D, E, F} is selected from the instruction data {A, B, C, D, E, F, G, H}. As shown in FIG. 11, an order of the instruction string of {C, D, E, F} selected by the latch circuits 70, 71, 72, 73 is E, F, C, and D. Namely, the instruction unit (bit string unit) E is selected in the half word block $H_0$, the instruction unit F is selected in the half word block $H_1$, the instruction unit S is selected in the half word block $H_2$, and the instruction unit D is selected in the half word block $H_3$. Note, this instruction data E, F, C, D is rotated and transferred by the transfer circuit 8 as shown in FIG. 10, In this case (which is the same case shown in FIG. 9C), in the transfer circuit shown in FIG. 10, the signal $S_3$ is determined at a high level and the other signals $S_4$, $S_1$, $S_2$ are determined at low levels, so that output of the transfer circuit 8 is rotated to original order as an instruction data C, D, E, F.

Figure 12:
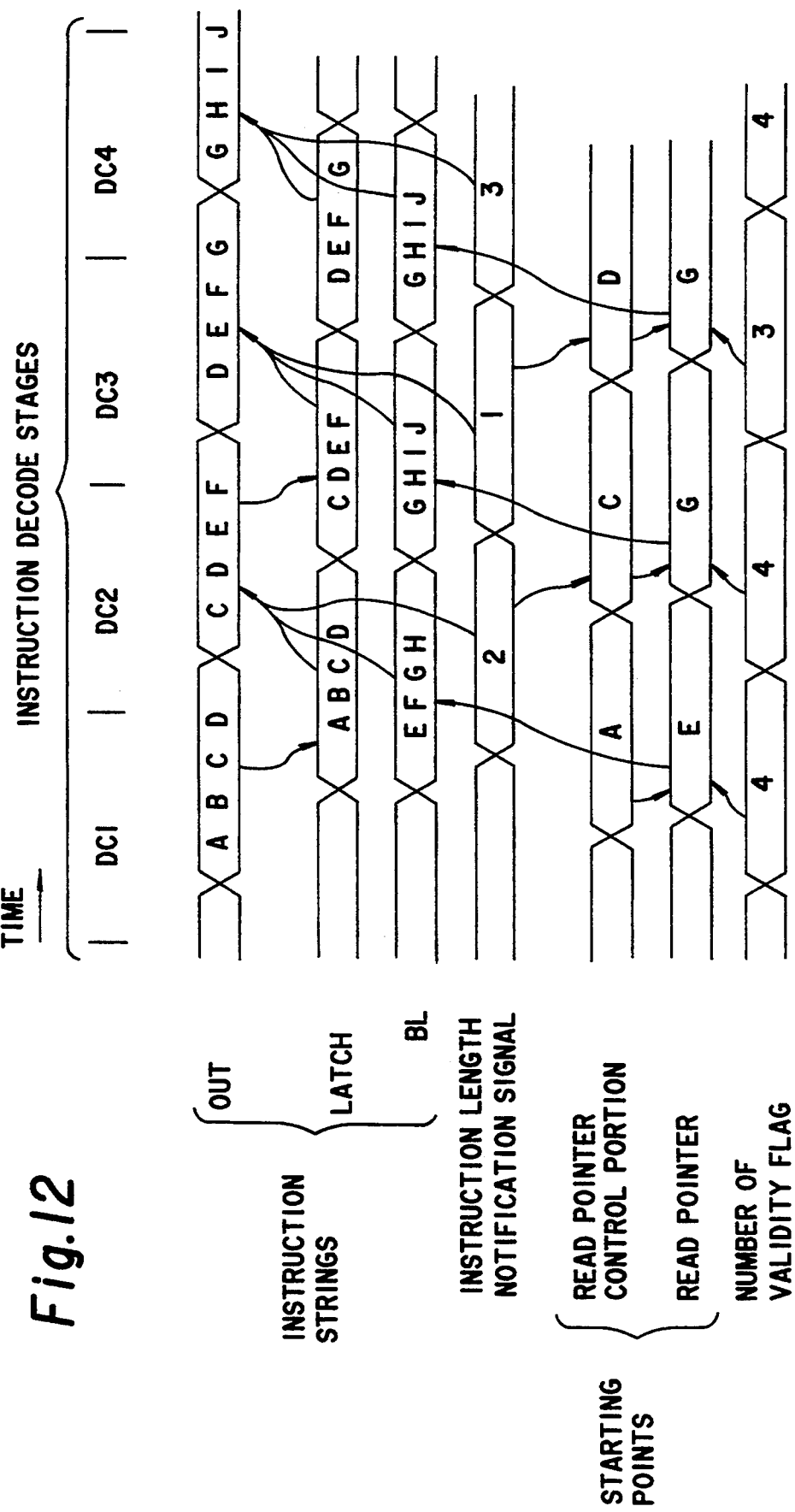
FIG. 12 is a diagram for explaining pipeline processing operations in the data processing device according to the present invention.

FIG. 12 is a diagram for explaining pipeline processing operations in the data processing device according to the present invention. In FIG. 12, reference OUT denotes an instruction bit string which is transferred from the instruction buffer IB to the instruction decoder 9 through the transfer circuit 8, LATCH denotes an instruction string which is held temporarily in the latch circuit 7 shown in FIG. 5, and BL denotes an instruction bit string which is read out from the memory cells $a_{11} \sim a_{mn}$ to the bit lines BL. Furthermore, reference DC1 denotes an instruction decode stage for an instruction 1, and DC2 denotes another instruction decode stage for an instruction 2. Note, references A, B, C, ... denote instruction units (codes) or bit string units (for example, each constituted by a half word of 16 bits), and an instruction length of four instruction bit units (for example, 64 bits) are required at one time for an instruction decoding processing.

In FIG. 12, an instruction bit string for the stage DC1 is data string of {A, B, C, D} in a transition of the pipeline processing of an instruction bit string OUT transferred to the instruction decoder 9, and if all data strings of {A, B, C, D} are valid instruction bit strings (bit string units), instruction bit strings which are able to be transferred for the stage DC2 anticipate the instruction length notification signal (0, 1, 2, 3, 4; length of instruction units, or unit length), are determined at 8 bit string units (unit instruction length bit strings) of {A, B, C, D, E, F, G, H}.

In this case, the read pointer control portion 4 is renewed to indicate a position A as a starting point (beginning), and the read pointer 5 is renewed to indicate a position E by shifting by unit lengths corresponding to the number of the validity flags (4 unit instructions of A, B, C, D constituting an instruction are all valid, and thus the number of the validity flags is determined as four), and such shifting is carried out starting from the position A indicated by the read pointer control portion 4. Then, by reading out in advance the starting position (lead position) E and the following strings such as {E, F, G, H} in the bit lines BL, 8 bit strings units of {A, B, C, D, E, F, G, H} are prepared. Note, an instruction string (data string) of {C, D, E, F} is selected from among the data strings of {A, B, C, D, E, F, G, H} by the select circuit 6 and is transferred to the instruction decoder 9 in accordance with an output of the instruction length notification signal {2} (which indicates that the bit string units A, B have already been decoded) by the stage DC1.

If an instruction bit string transferred for a stage DC3 is constituted by {D, E, F, G,}, and the bit string units of {D, E, F,} form a valid instruction bit string, or the bit string unit {G,} is invalid, then instruction bit strings which can be transferred for a stage DC4 anticipate the instruction length notification signal (0, 1, 2, 3 unit length), is determined as 7 bit string units of {C, D, E, F, G, H, I}. The reason for the above is that instruction bit string at the time of being transferred for the stage DC3, and the instruction length notification signal of {4} is never determined. The read pointer control portion 4 is therefore renewed to indicate the position D, and the read pointer 5 is renewed to indicate the position G by shifting by unit lengths of 3.

In the above described manner, when 7 bit string units of {C, D, E, F, G, H, I} are prepared, the bit string unit G which has been invalid (if G is invalid, it indicates that sequentially following H, I, J, . . . are also invalid) anticipates that data are supplemented during the time of the stage DC3 from the memory management unit 1 and that the bit string unit G is made to be valid, and thus another operation of reading out data to the bit lines BL is carried out in accordance with the read pointer 5. Similarly, in the same manner as described above, the procedures of ∓transferring operation of an instruction bit string"→"selection operation of the next instruction bit string"→"transferring operation of an instruction length notification signal"→"selection operation of the next instruction bit string"→"transferring operation of the next instruction bit string", are repeated, and transition of the instruction decode stage can be carried out at high speed. Note, the instruction bit string transferred to the instruction decoder 9 in an immediately preceding stage is temporarily stored in the latch circuit 7, and without providing another bit line BL (accordingly, another word line WL) for another reading out operation of the immediately preceding transferred instruction bit string, so an instruction reading out operation can be executed wherein a time from "notification time of an instruction length notifying" to "starting time of the next instruction decoding" is extremely reduced by the procedure of selecting the instruction bit string in which the next instruction is taken as a start point according to the instruction length notification signal.

As described above, in the data processing device according to the present embodiment, an instruction bit string following a memory position indicated as a start point by a read pointer 5 is previously read out to a plurality of bit lines BL, and an instruction bit string already transferred is temporarily stored in a latch circuit 7, so that a next instruction bit string following a next instruction can be selected therefrom without requiring another bit line or word line. Therefore, a high speed instruction processing in the pipeline processing can be realized without increasing the number of transistors and wirings constituting memory cells in an instruction buffer, and thus a large scale integration, a small size, and a low cost can be realized.

According to the present invention, as described above, in the data processing device particularly as used for a pipeline process, a high speed transition can be realized from the instruction decode stage to the next instruction decode stage, and accordingly instruction processing speed can be improved as a whole for the data processing device. Furthermore, according to the present invention, a drawback in that transistors and wirings thereof tend to increase along with an improvement in instruction processing speed is greatly reduced, and consequently, a large scale integration, a small size, and a low cost can be realized.

Many widely differing embodiments of the present invention may be constructed without departing from the spirit and scope of the present invention, and it should be understood that the present invention is not limited to the specific embodiments described in this specification, except as defined in the appended claims.

We claim:

1. A data processing device comprising:

an instruction decoder decoding a first instruction bit string of a plurality of instruction bit strings and discriminating an instruction length of said instruction contained in said first instruction bit string, and for outputting an instruction length notification signal; and an instruction buffer memory, connected to said instruction decoder, for transferring said first instruction bit string to said instruction decoder, including:

a memory means, for storing said plurality of instruction bit strings;

a latch means, for temporarily holding each instruction bit string of said plurality of instruction bit strings transferred in an immediately preceding step;

a validity control means, for outputting a unit validity flag indicating whether each of a plurality of bit string units constituting each instruction bit string of said plurality of instruction bit strings transferred to said instruction decoder is valid or not as an instruction;

a read pointer control means, for indicating a memory position in said memory means where each said instruction bit strings transferred to said instruction decoder has been stored;

a read pointer indicating another memory position obtained by shifting by a unit length corresponding to the number of said unit validity flag, from the memory position indicated by said read pointer control means; and a select means for selecting a next instruction bit string sequentially continuing from a next instruction, between said first instruction bit string and a second instruction bit string, said first instruction bit string being previously read out from a plurality of memory cells in said memory means to a plurality of bit lines by a memory position indicated by said read pointer being a start point, and said second instruction bit string being temporarily held in said latch means by an instruction length notification signal output from said instruction decoder, said select means being controlled in accordance with a control signal output from said instruction decoder, said instruction decoder receiving said bit string units from said select means, said latch means and said select means constituting a feedback loop, each instruction bit string of said plurality of instruction bit strings, output from said instruction buffer memory being transferred through a transfer circuit to said instruction decoder, and said transfer circuit rotating a plurality of said bit string units consisting each of said instruction bit strings for changing the order of said bit string units to an original order.

2. A monolithic microprocessor formed in a single semiconductor body, comprising an instruction control unit for controlling fetching, decoding, and executing of instructions, an instruction execution unit for calculating an operand address and executing an operand operation, a memory management unit, and a bus control unit for transferring data among an external I/O, an external memory, and said data processing device through the chip bus, wherein said instruction control unit comprises:

an instruction decoder, for decoding a first instruction bit string of a plurality of instruction bit strings, for discriminating an instruction length of said instruction contained in said first instruction bit string, and for outputting an instruction length notification signal;

an instruction buffer memory having a plurality of rows, each of said rows storing a plurality of bit string units, said instruction decoder being supplied with said plurality of bit string units;

a read pointer, for indicating one of said rows;

a latch means, connected to said instruction buffer memory, for storing bit string units of said plurality of bit string units read out in an immediately preceding step from one of said rows; and a select means, for selecting an output of said instruction buffer memory or an output of said latch means to supply a beginning bit string unit of the plurality of bit strings of the instruction and a subsequent bit string unit thereof, said select means being controlled in accordance with a control signal output from said instruction decoder, said instruction decoder receiving said bit string units from said select means, said latch means and said select means constituting a feedback loop, the bit string units selected by said select means being transferred through a transfer circuit to said instruction decoder, and said transfer circuit rotating a plurality of said bit string units selected by said select means constituting an instruction bit string for changing the order of said bit string units to an original order.

3. A data processing device comprising, a memory management unit, an instruction buffer memory connected to said memory management unit, and an instruction decoder connected to said instruction buffer memory, for decoding a first instruction bit string of a plurality of instruction bit strings transferred from said instruction buffer memory, for discriminating an instruction length of said instruction contained in said first instruction bit string, and for outputting an instruction length notification signal, wherein said instruction buffer memory comprises:

a memory portion, for storing said plurality of instruction bit strings;

a latch circuit, for temporarily holding said first instruction bit string transferred in an immediately preceding step;

a validity control portion, for outputting a unit validity flag indicating whether each bit string unit constituting said instruction bit string transferred to said instruction decoder is valid or not as an instruction;

a read pointer control portion, for indicating a memory position in said memory portion where said plurality of instruction bit strings transferred to said instruction decoder has been stored;

a read pointer, for indicating another memory position obtained by shifting by a unit length corresponding to the number of said unit validity flag, from the memory position indicated by said read pointer control portion; and a select circuit, for selecting a next instruction bit string from said plurality of instruction bit strings sequentially continuing from a next instruction, between said first instruction bit string and a second instruction bit string, said first instruction bit string being previously read out from a plurality of memory cells in said memory portion to a plurality of bit lines by a memory position indicated by said read pointer being a start point, and said second instruction bit string being temporarily held in said latch circuit by an instruction length notification signal output from said instruction decoder, said select circuit being controlled in accordance with a control signal output from said instruction decoder, said instruction decoder receiving said bit string units from said select circuit, said latch circuit and said select circuit constituting a feedback loop, each instruction bit string of said plurality of instruction bit strings, output from said instruction buffer memory being transferred through a transfer circuit to said instruction decoder, and said transfer circuit rotating a plurality of said bit string units consisting each of said instruction bit strings for changing the order of said bit string units to an original order.

4. A data processing device as claimed in claim 3, wherein said instruction buffer memory is divided into a plurality of blocks each constituted by a half word.

5. A data processing device as claimed in claim 4, wherein each of said blocks includes a plurality of memory cells, a latch circuit, and a select circuit, respectively.

6. A data processing device as claimed in claim 5, wherein each of said memory cells in a row is connected to a single word line through a single gate transistor and a single bit line for a reading out operation.

7. A data processing device as claimed in claim 3, wherein said data processing device is used for a variable length instruction system using pipeline processing.

8. A data processing device for executing a variable length instruction, wherein said data processing device comprises:

an instruction buffer memory having a plurality of rows, each of said rows storing a plurality of bit string units;

a read pointer, for indicating one of said rows;

an instruction decoder supplied with said plurality of bit string units;

a latch means, connected to said instruction buffer memory, for storing at least one of said plurality of bit string units read out in an immediately preceding step from one of said rows; and a select means, for selecting an output of said instruction buffer memory or an output of said latch means to supply a beginning bit string unit of said plurality of bit string units of the instruction and subsequent bit string unit, said select means being controlled in accordance with a control signal output from said instruction decoder, said instruction decoder receiving said bit string units from said select means, said latch means and said select means constituting a feedback loop, the bit string units selected by said select means being transferred through a transfer circuit to said instruction decoder, and said transfer circuit rotating a plurality of said bit string units selected by said select means constituting an instruction bit string for changing the order of said bit string units to an original order.

9. A data processing device as claimed in claim 8, wherein each of said rows in said instruction buffer memory is divided into a plurality of blocks.

10. A data processing device as claimed in claim 9, wherein each of said blocks includes a plurality of memory cells, said latch means includes a plurality of latch circuits, said select means includes a plurality of select circuits, and each select circuit group is controlled to output data selected from a combination data of the output of said instruction buffer memory and the output of said latch means.

11. A data processing device as claimed in claim 10, wherein each of said memory cells in one of said rows is connected to a single word line through a single gate transistor and a single bit line for a reading out operation.

12. A data processing device as claimed in claim 8, wherein said data processing device is used for a variable length instruction system using pipeline processing.

13. A data processing method for supplying a variable length instruction from an instruction buffer memory to an instruction decoder, wherein said data processing method comprises:

a step of temporarily holding a first instruction bit string read out in an immediately preceding step from said instruction buffer memory;

a step of reading out a second instruction bit string from said instruction buffer memory at a memory position indicated by a read pointer; and a step of selecting third instruction bit strings from among a plurality of first and second instruction bit strings.

* * * * *